UNITED STATES PATENT OFFICE.

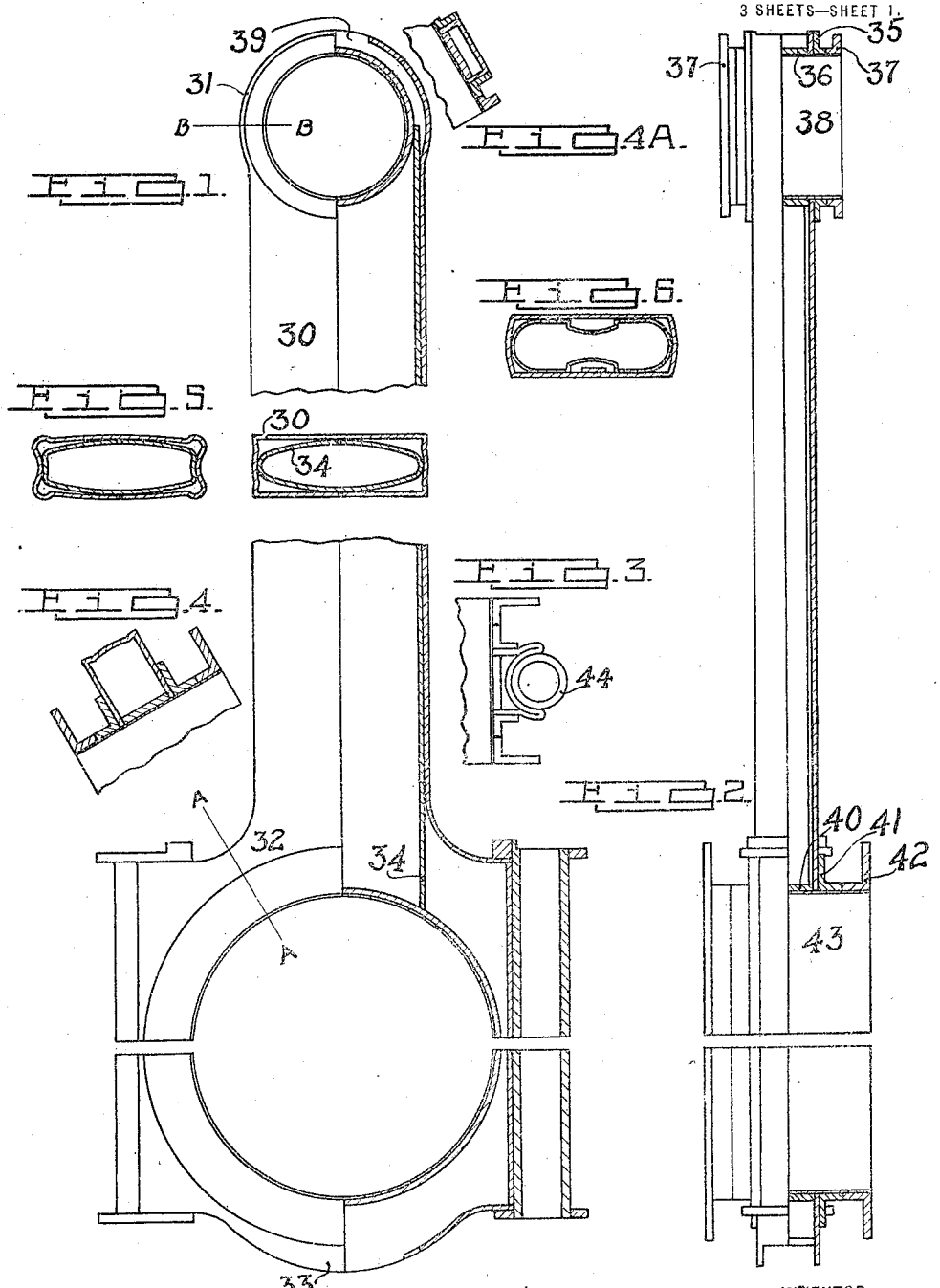

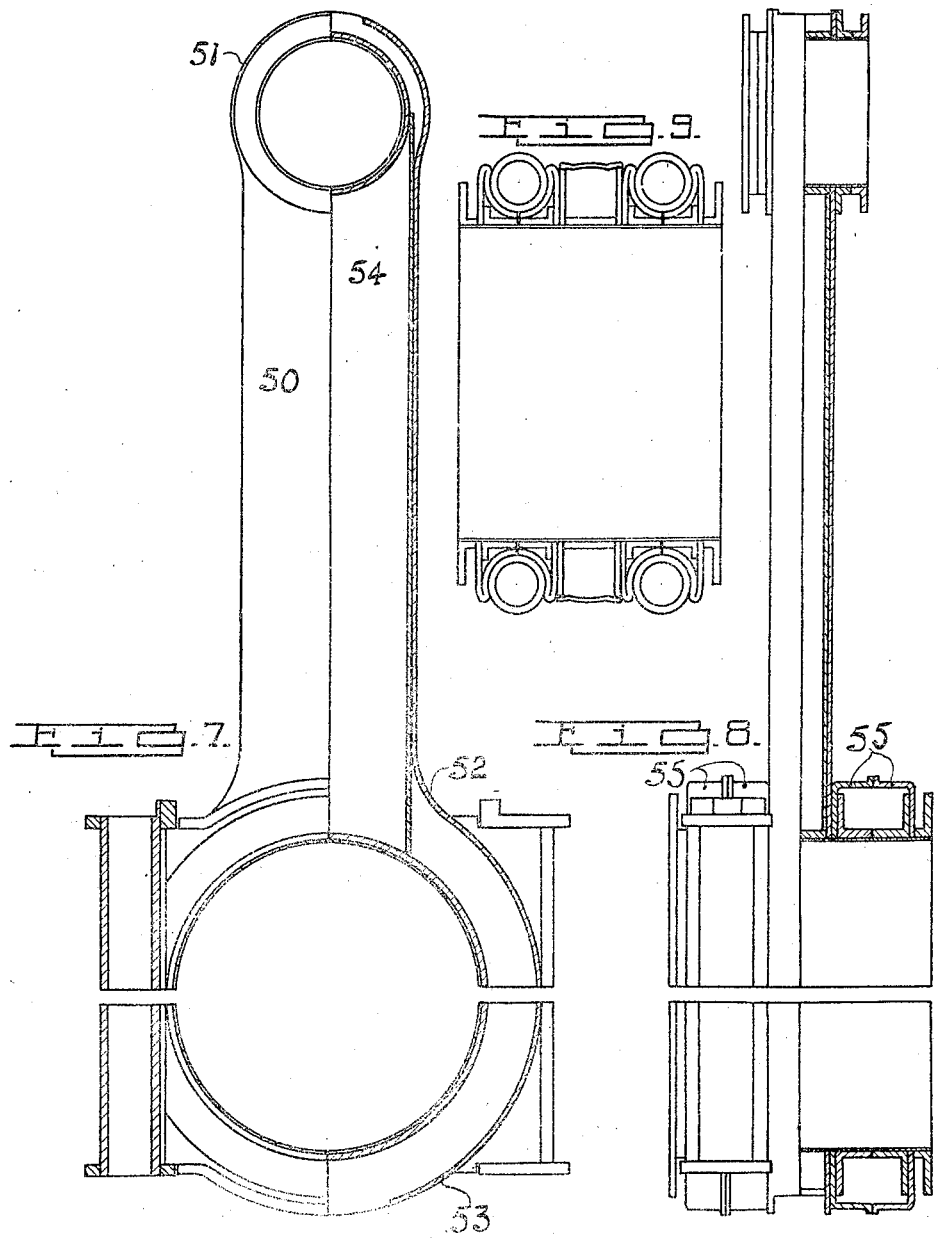

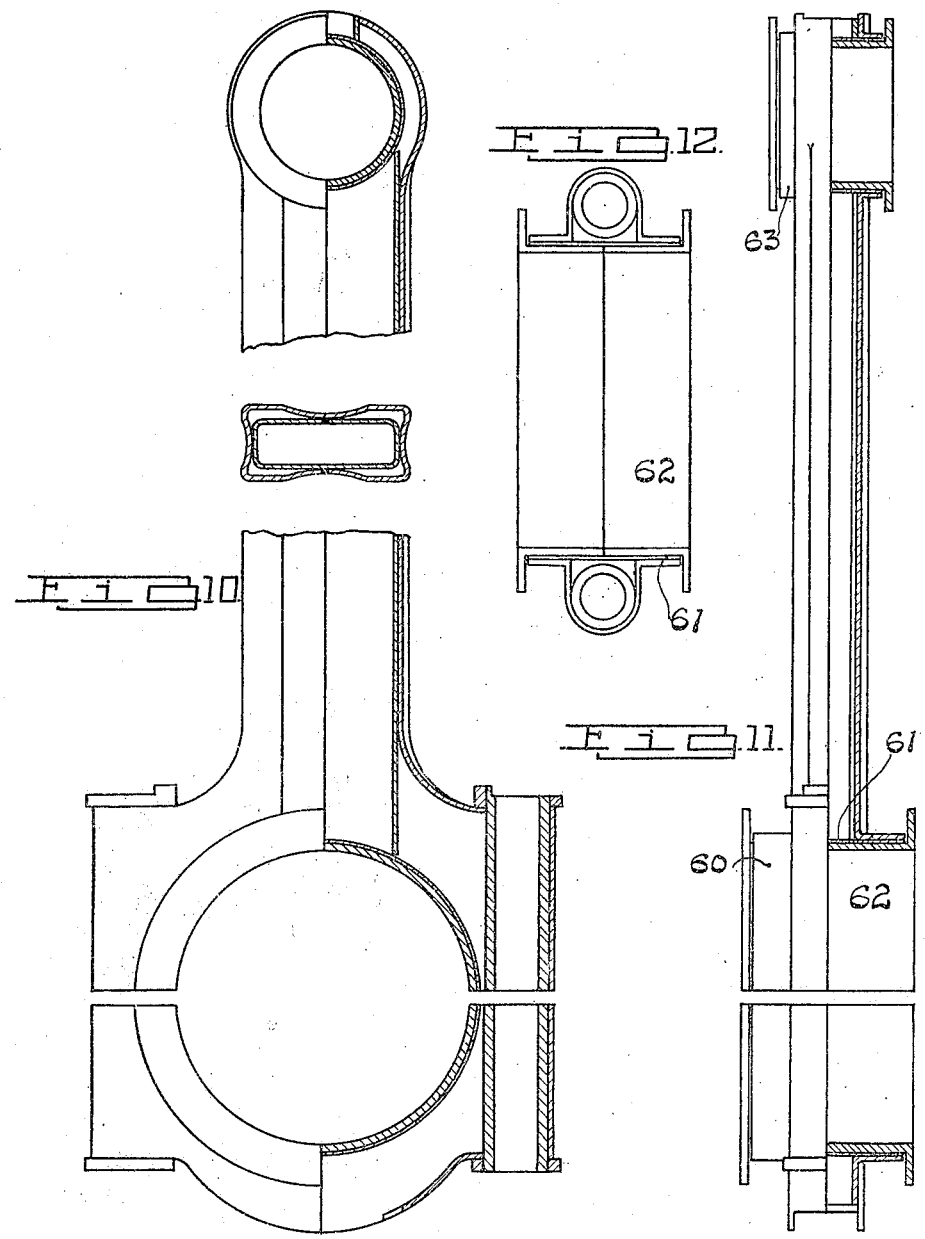

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING-ROD.

1,380,658.

Specification of Letters Patent.

Patented June 7, 1921.

Application filed March 24, 1917. Serial No. 157,273.

*To all whom it may concern:*

Be it known that I, HEBRON BERNARD LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to sheet metal connecting rods. Its purpose is to provide a new and novel form of connecting rod of minimum weight and comprising a shell having the fewest joints consistent with cheap and easy manufacture. Other objects will appear hereafter in the specification and claims.

By way of example, I show in the drawings at—

Figure 1 a side elevation, one-half in section, of a sheet metal connecting rod, embodying features of the invention.

Fig. 2 is an elevation, one-half in section, of the rod in Fig. 1.

Fig. 3 is a broken view showing the abutting face of either the rod or the cap.

Fig. 4 is a section on the line A—A of Fig. 1.

Fig. 4ª is a section on the line B—B of Fig. 1.

Figs. 5 and 6 show modified forms of shank.

Figs. 7 and 8 show a modified form of connecting rod, and correspond with Figs. 1 and 2, but disclose a four-bolt rod as compared with the two-bolt rod of the earlier figures.

Fig. 9 is a view of the abutting face of either the rod or cap of Figs. 7 and 8.

Figs. 10, 11 and 12 show yet another modified form of rod. Figs. 10 and 11 correspond to Figs. 1 and 2, and Fig. 12 is a view of the abutting face of either the rod or cap.

In Figs. 1 to 6 inclusive, 30 is the shank of the shell of the rod, terminating in a piston pin boss 31 and a crank head end 32, which is provided with a cap 33. It will be seen that this shank is composed of a single piece of sheet metal and has but a single joint, this occurring in one side wall of the shank on a line drawn through the axis of the crank and piston ends of the rod.

I may join the two edges of the shell in any manner, but I prefer to electrically weld them first and then braze or fuse them as hereafter referred to.

The shank is provided with a reinforcing member 34, which extends throughout its length, uniting and supporting the walls of the piston and crank pin bosses, and aiding the shank to withstand compression.

Each side wall of the piston pin boss is apertured and provided with a flanged bushing or a cuff 35, and these side walls are spaced apart by a liner bushing 36. Additional flanged bushings or cuffs 37 complete the length of the piston pin boss; an inner liner bushing 38, preferably of steel of different hardness or temper from that of the flanged bushings, is secured within the boss and completes the assembly thereof.

In constructing these rods, I prefer to make the bushings 35, 36 and 37 of high carbon or alloy steel of great hardness and high tensile strength. Such steel is not easily welded or machined, so in the incorporation of the inner lining 38, I provide a thin wall of softer material, preferably steel, which I use as a tubular rivet, spinning the ends over to secure the several flanged bushings to the piston pin boss.

In the course of manufacture, after all of the bushings, including those of the crank end hereafter referred to, are assembled to the rod, all of the parts are brazed or fused together by immersion in a molten alloy of metals and subsequently heat treated. Thereafter the piston pin boss inner liner 38 is partly or completely machined away both in its diameter and at its ends.

At the extreme end of the rod the shell is apertured at 39 to provide means for the free ingress and egress of spelter from and to the rod, in the course of the brazing or fusing previously referred to. This also provides an opening for oiling the piston pin, if it is desired.

The crank head end 32 of the rod with its cap 33 are provided with a liner 40 spacing apart the side walls thereof, to which are secured flanged bushings 41 and 42 by means of the inner liner 43, all corresponding to the bushings of the piston pin end of the rod. The flanges of these bushings radially reinforce the crank pin boss, materially aiding to prevent the boss going out-of-round when in service. They also effectually radiate heat generated in the crank and piston pin bearings.

The metal of the crank head end of the rod at each side of the crank pin aperture, is bent back upon itself and depressed, as is clearly shown in Fig. 3, to receive a bolt boss liner or thimble 44. When the parts are fused together the formed walls of the rod shell become fused with the metal of the bolt boss liner or thimble 44, and all of this metal together, comprising the bolt boss, is used to withstand the tension of the cap bolts not here shown.

I prefer to form the cap integral with the rod shell, and to sever it therefrom after the brazing or fusing has been done.

In Figs. 7 to 9 inclusive, the shank 50 terminates in the piston pin boss 51 and the crank pin boss 52, which has a cap 53. The shank has a reinforcement 54, the arrangement of the parts corresponding to that of Figs. 1 to 6 inclusive, but the construction of the crank end of the rod differs materially. The crank head end 52 of the rod shell has secured to each of its side walls similar formed sheet metal bolt boss members 55, two of which comprise one bolt boss. Where the crank pin bearing is of great width, such four-bolt caps are necessary or desirable.

In Figs. 10 to 12 inclusive, I show a rod generally corresponding with the figures of the first sheet of the drawings, but it will be observed that here there is a difference in the construction of the crank and piston pin bosses. For example, each side wall of the crank pin boss is provided with an integral and outwardly extending cuff 60 which together comprise the crank pin boss. This boss is provided with a liner bushing 61 within which and abutting at the center line of the rod are flanged bushings 62.

It should be noted that the integral cuff 60 at one side of the rod has two joints, one on the rod portion and the other on the cap portion, both occurring on a line drawn through the axis of the piston and crank pin bosses, while the integral cuff 60 on the other side of the rod is without such joints. Similarly, one of the cuffs 63 of the piston pin boss has two joints.

In Letters Patent, 1,176,301 and 1,176,304, I have shown connecting rods formed from two substantially similar abutting parts of sheet metal. The rod of this present invention is an improvement upon the rods of the patents referred to, inasmuch as in this rod the perfect box-girder construction is attained with but a single longitudinal joint along the shank of the rod shell, and is without thin protruding flanges, which are easily deformed in handling or shipping or when assembling the rods in the motors for which they are destined. Further, as the joint occurs in the plane of the axis of the crank and piston pin bosses and along the side of the shank, it is less likely to be deformed than if the joint were made at right angles thereto.

Connecting rods of minimum weight can only be attained by disposing the metal of the rod in shapes theoretically and practically correct, and employing the minimum cross section for a given load. Such is the invention herein disclosed.

Heretofore I have used the word "shell" in referring to the main part of the connecting rod. By "shell" I mean the shank portion and one or both end portions integral therewith, exclusive of cap or flanged bushings, or liner bushings, or bolt boss bushings, or shank reinforcement, or similar small parts.

My use of the word "shell" will apply with equal force to connecting rods with or without caps. Rods of the latter class I have described in United States Patent No. 1,176,300.

Where I use the term "sheet metal" hereinafter in the claims, I wish it understood that I mean any form of metal which partakes of the nature and characteristics of sheet metal, as distinguished from castings and forgings.

Having fully described my invention, what I claim as new and desire to secure by Letters Patent, is;—

1. A connecting rod comprising a one-piece sheet metal shell and having an integral head portion and having a single joint.

2. A connecting rod comprising a one-piece sheet metal shell and having an integral head portion having a single joint longitudinal of the shank portion thereof.

3. A connecting rod comprising a one-piece sheet metal shell and having an integral head portion having a single joint longitudinal of the shank portion thereof, and in the plane of the crank and piston pin axes.

4. A connecting rod comprising a one-piece sheet metal shell and having an integral head portion, and having a longitudinal joint in only one side wall of the crank head end thereof.

5. A connecting rod comprising a one-piece sheet metal shell having a single longitudinal joint, and provided with an integral crank end adapted to be divided transversely to form a cap.

6. A connecting rod comprising a one-piece sheet metal shell and having an integral head portion having a single longitudinal joint and an opening in each end of the shell.

7. A connecting rod comprising a one-piece sheet metal shell and having an integral head portion having a longitudinal joint, and a reinforcement for said joint.

8. A connecting rod comprising a one-piece sheet metal shell and having an integral head portion having a hollow shank, and a reinforcement within said shank.

9. A connecting rod shell composed of one piece of longitudinally jointed sheet metal with an integral head portion, the two edges of which are united in a single longitudinal joint.

10. A connecting rod having a one-piece sheet metal crank shaft head with a single longitudinal joint.

11. A connecting rod comprising a one-piece sheet metal shell having a single longitudinal joint, and provided with a crank shaft bearing, said rod being adapted to be separated through said bearing to form a cap, and having means for connecting the cap with the rod.

12. A connecting rod comprising a one-piece sheet metal shell having a single longitudinal joint, and provided with a bearing; said rod being adapted to be separated through the bearing to form a cap, the rod and cap portions having attaching bosses.

13. A connecting rod cap having a single longitudinal joint in one side wall thereof.

14. A one-piece sheet metal connecting rod cap having a single joint.

15. A one-piece sheet metal connecting rod cap having a single joint, and provided with radial flanges around the crank shaft aperture.

16. A connecting rod having a one-piece sheet metal cap with a single joint, and provided with ferrules through which are passed bolts to secure the cap to the rod.

17. A connecting rod comprising a one-piece sheet metal shell having a single longitudinal joint, and provided with crank and piston pin bosses and reinforcing flanges therearound.

HEBRON BERNARD LAYMAN.

It is hereby certified that in Letters Patent No. 1,380,658, granted June 7, 1921, upon the application of Hebron Bernard Layman, of New York, N. Y., for an improvement in "Connecting-Rods," errors appear in the printed specification requiring correction as follows: Page 2, lines 129–130, before the compound word "one-piece" insert the words *longitudinally jointed;* page 3, line 4, claim 9, strike out the words "longitudinally jointed;" and that the said Letters Patent should be read with these corrections therein that the same may conform to the record of the case in the Patent Office.

Signed and sealed this 12th day of July, A. D., 1921.

[SEAL.]

KARL FENNING,

*Acting Commissioner of Patents.*

Cl. 74—17.